United States Patent
Vuu et al.

(10) Patent No.: US 12,306,104 B2
(45) Date of Patent: May 20, 2025

(54) PARTICULATE DETECTION, COUNTING, AND IDENTIFICATION

(71) Applicant: Wynd Technologies, Inc., San Jose, CA (US)

(72) Inventors: Jason Duy Vuu, San Jose, CA (US); Raymond Rui Wu, Millbrae, CA (US)

(73) Assignee: Wynd Technologies, Inc., San Mateo, CA (US)

( * ) Notice: Subject to any disclaimer, the term of this patent is extended or adjusted under 35 U.S.C. 154(b) by 0 days.

(21) Appl. No.: 17/970,055

(22) Filed: Oct. 20, 2022

(65) Prior Publication Data

US 2023/0117469 A1  Apr. 20, 2023

Related U.S. Application Data

(60) Provisional application No. 63/257,721, filed on Oct. 20, 2021.

(51) Int. Cl.
  *G01N 21/64* (2006.01)

(52) U.S. Cl.
  CPC ..... *G01N 21/6486* (2013.01); *G01N 21/6402* (2013.01); *G01N 2021/6421* (2013.01); *G01N 2021/6495* (2013.01); *G01N 2201/126* (2013.01)

(58) Field of Classification Search
  CPC ........... G01N 21/6486; G01N 21/6402; G01N 2021/6421; G01N 2021/6495; G01N 2201/126
  See application file for complete search history.

(56) References Cited

U.S. PATENT DOCUMENTS

| | | | |
|---|---|---|---|
| 6,710,878 B1 * | 3/2004 | Dean | G01N 21/532 356/338 |
| 2017/0241893 A1 * | 8/2017 | Walls | G01N 15/0205 |
| 2022/0157408 A1 | 5/2022 | Vuu et al. | |
| 2022/0176006 A1 | 6/2022 | Vuu et al. | |

FOREIGN PATENT DOCUMENTS

| | | | | |
|---|---|---|---|---|
| EP | 3483585 A1 * | 5/2019 | | G01N 1/2273 |
| EP | 3995806 A1 * | 5/2022 | | A61L 9/20 |
| EP | 4012378 A1 * | 6/2022 | | G01N 15/0205 |
| WO | WO-2010132367 A1 * | 11/2010 | | G01N 15/0211 |

OTHER PUBLICATIONS

Vishay Semiconductors, TEM5010X01 "Silicon PIN Photodiode", Document No. 84679, Rev 1.5, Aug. 23, 2011, www.vishay.com, pp. 1-6.

Vishay Semiconductors, TEM5080X01 "Silicon PIN Photodiode", Document No. 81643, Rev 1.3, Aug. 23, 2011, www.vishay.com, pp. 1-6.

* cited by examiner

*Primary Examiner* — Dani Fox
*Assistant Examiner* — Fani Polyzos Boosalis
(74) *Attorney, Agent, or Firm* — David T. Millers

(57) ABSTRACT

Particulate sensing systems or processes identify particulates suspended in an air sample by irradiating the air sample with UV light and measuring light from individual particles in the air sample. Two photodiodes having different wavelength sensitivity may be used to measure the fluorescent light emitted from a single particle, and a type of the particle may be identified using outputs from photodiodes. Repeating the process for multiple particles may produces distributions that further distinguish or identify particulate types.

14 Claims, 2 Drawing Sheets

PARTICULATE DETECTION, COUNTING, AND IDENTIFICATION

CROSS-REFERENCE TO RELATED APPLICATIONS

This patent document claims benefit of the earlier filing date of U.S. provisional Pat. App. Ser. No. 63/257,721, filed Oct. 20, 2021, which is hereby incorporated by reference in its entirety.

BACKGROUND

Particulate matter (PM) sensors can measure the concentration of particulates suspended in air, and a particulate sensor may output a measurement indicating the density or count of particulates in a size range. For example, a PM2.5 sensor may measure an air sample to determine the concentration or count of detectable particulates that are 2.5 microns or less in diameter. Current PM sensors commonly use lasers to irradiate particles suspended in an air sample and then collect scattered light to detect or measure the suspended particles. Conventional PM sensors do not identify a particle or pollutant type (e.g., pollen, pet dander, mold spores, smog, etc.) Pollutant type may be important because some types of pollutants, particularly biomatter, may be potent allergens or health risks.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

In accordance with an aspect of the present disclosure, airborne particles including biological matter (also referred to as biomatter) such as mold, pollen, and other biological aerosols in an air or other gas sample may be exposed to a beam of short wavelength light such as ultraviolet (UV) light that may cause particles of biological matter to fluoresce. The light (fluorescent and otherwise) from interactions of the short wavelength light with individual particles may be measured at a high sampling rated that provides multiple measurements for each particle, and analysis of the measurements, e.g., determination of particle sizes, particle size distributions, particle reflectivity, reflectivity distributions, spectral differences in the measured light, and the temporal distribution of peeks in measured light, may indicate or distinguish different biological and non-biological particle types.

In accordance with another aspect of the present disclosure, a particulate sensor may employ an analysis system to analyze measurements and identify or distinguish types of particulates in a gas sample. A particulate sensor or sensing process in some examples may employ artificial intelligence (AI) techniques in a multifactor analysis that identifies particulate types. (Particulate type as used herein is distinct from particulate size and may identify the classification, composition, or source of one or more particulates in a sample.) One factor used in identification of particulate types is fluorescence of the particulates when a gas sample is exposed to a beam of short wavelength light, e.g., UV light having a wavelength of about 400 nm or less. Other factors used in identification of particulate types may be determined using measurements of the interactions of the particulates with light include particulate sizes, the distribution of particulate sizes, the intensity of light deflected at a measured angle, and the concentration of the particulates observed in a gas sample. Additional factors used in identification of particulate types may include measurements of the environment being sensed and contextual data from the Cloud.

Figure 1:
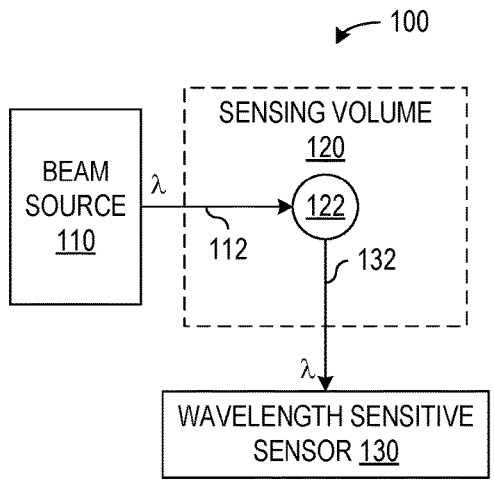
FIG. 1 illustrates an example of a particulate matter sensor in accordance with an example of present disclosure when sensing a particle that does not fluoresce.
Figure 2:
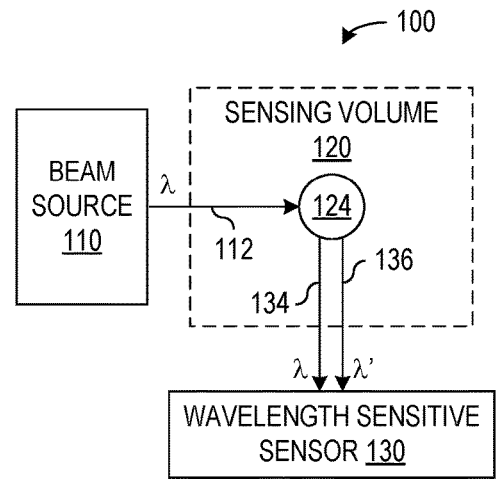
FIG. 2 illustrates an example of a particulate matter sensor in accordance with an example of present disclosure when sensing a particle such as a biomatter particle that fluoresces.

FIGS. 1 and 2 show a particulate matter sensor 100 in accordance with an example of the present disclosure. Particulate matter sensor 100 includes a beam source 110, a sensing cavity or volume 120, and a wavelength sensitive sensor 130. Beam source 110 is positioned to direct a collimated or focused, monochromatic beam 112 having a known wavelength $\lambda$, into sensing volume 120, and wavelength sensitive sensor 130 is positioned to measure light leaving sensing volume 120 at a specific angle or range of angles from the direction or axis of beam 112. Sensing volume 120 may hold a sample of air or another gas, and particulate matter, e.g., a particle 122 or 124 shown in FIG. 1 or 2, of an unknown size, shape, and type or composition may be suspended in the sample in sensing volume 120. Each particle in sensing volume 120 may individually pass through and interact with beam 112, and the interaction of beam 112 with an individual particle 122 or 124 produces deflected light 132 or 134 and 136 at non-zero deflection angles relative to the axis or direction of beam 112. Sensor 130 measures light leaving sensing volume 120 at a specific deflection angle or in a range of deflection angles. Wavelength sensitive sensor 130 can thus measure off-axis light resulting from interactions of light beam 112 with particulates, e.g., particle 122 or 124, in sensing volume 120.

The interaction of beam 112 with a suspended particle in general may cause elastic scattering of light, e.g., Rayleigh scattering and Mie scattering, or inelastic scattering of light, e.g., Raman scattering and Brillouin scattering. Elastic scattering or reflection produces deflected photons having the same energy as the incident photons and therefore having the same wavelength as the incident photons. Inelastic scattering produces deflected photons having a lower energy than the incident photons and therefore having longer wavelengths than the incident photon wavelengths. The interaction of beam 112 with a particle may also cause fluorescence from the particle. Fluorescence generally results from excitation and relaxation of electronic states and produces photons having a longer wavelength than the incident photons, but fluorescence generally occurs over a longer time scale than typical for other inelastic scattering processes.

In the example of FIG. 1, particle 122 is of a type or a composition that elastically scatters or reflects light from beam 112 without causing any significant wavelength shift. As a result, deflected light 132 has the same (or substantially the same) wavelength $\lambda$ as incident beam 112. Wavelength sensor 130 may measure a wavelength or a wavelength dependent characteristic of deflected light 132. From the lack of change in the wavelength, sensor 100 may determine that particle 122 is a type of particle that doesn't significantly fluoresce. For example, particles from the burning of incense or inorganic particles such as sand or silicate particles do not significantly fluoresce when exposed to UV light having a wavelength around 400 nm. Sensor 100 may infer particle characteristics, e.g., the size, shape, density, or reflectivity at wavelength k, of particle 122 from characteristics of deflected light 132. For example, a peak intensity of light 132 depends on the reflectivity of particle 122 and the temporal distribution, e.g., the shape and width of the peak, of sensed light energy while particle 122 interacts with beam 112 depends on the size, shape, and velocity of the particle 122.

In the example of FIG. 2, the interaction of beam 112 with particle 124 produces light including an elastically scattered or reflected light component 134 having wavelength k, i.e., the same wavelength incident beam 112, and an inelastically scattered or fluoresced light component 136 having one or more different wavelength k'. In general, the timing or time distribution of deflected light 134 may differ from the timing or time distribution of deflected light 136, e.g., because particle 124 may delay emission of fluoresced light relative to reflected light. Sensor 130 may thus be used to distinguish particle 122 from particle 124 based on the spectrum or spectral differences of interaction-produced light 132 or 134 and 136 or other wavelength dependent characteristics of light 134 and 136. The time dependence of the measurements of light intensity at different wavelengths may further characterize interaction-produced light 134 and 136 to distinguish particles 124 and 122 and indicate a type for particle 124.

Mold, pollen, and other bio aerosols under UV light generally fluoresce with characteristic patterns, e.g., time delay and wavelength or wavelength shift. In accordance with an aspect of the current disclosure, the ability of a particulate sensor to measure characteristics of wavelength dependent patterns for deflected light allows specific biomatter types to be distinguished or identified and allows biomatter to be distinguished from inert particles.

Particulate distributions (e.g., size distributions) for collections of particles are often different for different types of particulates. For instance, mold typically produces particulates, e.g., mold spores, having a less uniform size distribution than the size distributions of typical pollens. The reflectivity and color distributions of different types of particulates may also be different resulting in different intensities of deflected light from particles of the same size. For example, brighter particles would have a stronger reflectance at the wavelength of the incident beam than would duller particles. A water aerosol may produce low intensity peaks since water droplets don't reflect light as strongly as do bright colored solids. Also, the wavelength of the fluorescent light (and correspondingly the frequency shift from the incident UV light to the fluoresced light) from a biomatter particulate may be different for each type of particulate and may be used as a factor when identifying a type of a biomatter in a gas sample.

Figure 3:
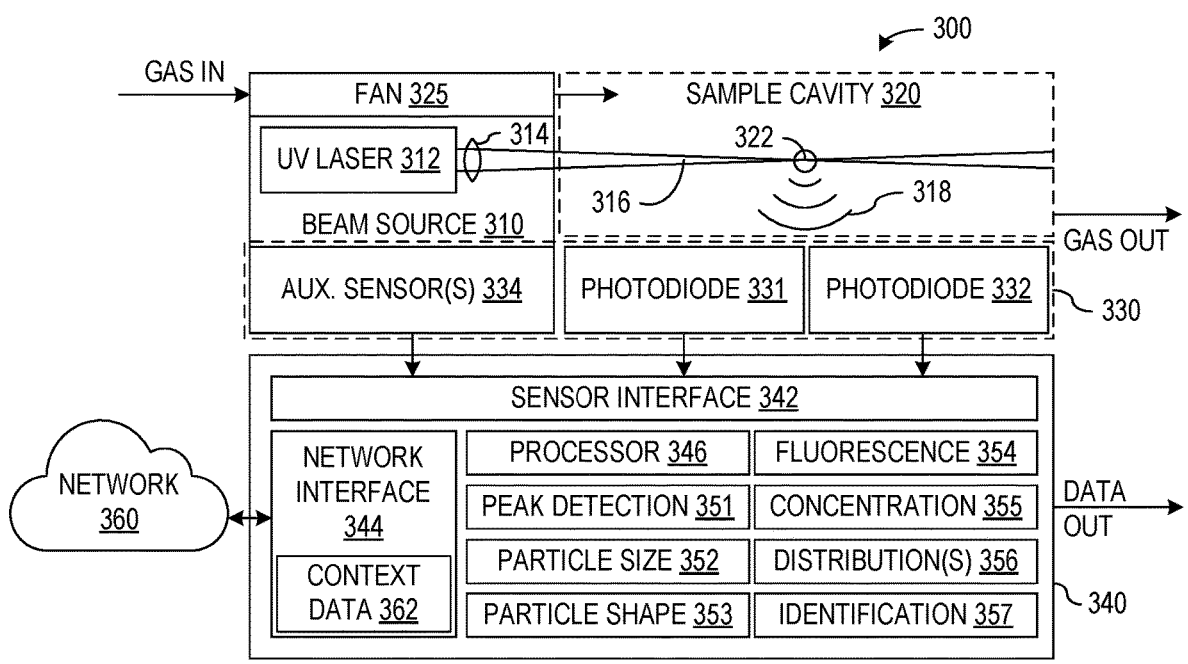
FIG. 3 is a block diagram of a particulate sensor in accordance with another example of the present disclosure.

FIG. 3 is a block diagram of a particulate sensor 300 in accordance with another example of the present disclosure. In this example, particulate sensor 300 is capable of real time detection and identification of particulate types. Particulate sensor 300 generally includes a beam source 310, a sensing cavity 320, a sensing system 330, and an analysis system 340. Beam source 310 may include a UV laser 312 with an optical system 314 that focus a beam 316 into a localized sensing volume within a sample cavity 320. To isolate deflected light 318 from the background light, sample chamber 320 may be a chamber, e.g., a 10 mm×10 mm×10 mm chamber, having black walls or walls that are otherwise highly absorptive of UV and visible light, and sensing system 330 may have photodiodes 331 and 332 with sensing surfaces exposed to the interior of sample cavity 320. The perimeters of photodiodes 331 and 332 may also be sealed with a foam to prevent external light from leaking into sample cavity 320.

The focus of beam 316 may be such that only one particulate at a time, of relevant size from an air sample is expected to enter the localized sensing volume, in which the particle can interact with beam 316 and produce deflected light 318 that sensing system 330 can measure. The duration of a pulse of deflected light 318 from an interaction of beam 316 with a particle in the sensing volume depends on the size of the sensing volume and the size and velocity of the particle. A fan or other air sampling system 325 may draw a gas sample, e.g., air from the surrounding environment, into sample cavity 320 in which beam 316 from beam source 310 is focused, and the speed of the air flow fan 325 causes in sample cavity 320 may indicate the speed of particles passing through the sensing volume. The size of the sensing volume and the velocity of particulates through the sensing volume being known and fixed by the operating parameters of sensor 300 means that the duration of a pulse of deflected light 318 indicates the size of the particle.

Sensing system 330 of detector 300 may include two (or more) sets of photodiodes 331 and 332, and each set of photodiodes 331 or 332 has different wavelength dependent responses. In one specific example, sensor 300 may be a dual photodiode system only having one photodiode 331 and one photodiode 332. Photodiodes 331 and 332 are positioned in or adjacent to sample cavity 320 to measure light that a particulate 322 may deflect or produce through scattering or fluorescence. While particulate 322 from the sampled air passes through the sensing volume where beam 316 is focused, particulate 322 reflects or scatters UV light and may fluoresce and therefore may produce deflected light 318 with the same wavelength as in incident beam 316 or containing one or more wavelengths that are longer than wavelength of incident beam 316.

Photodiodes in each set 331 or 332 differ from the photodiodes in the other set or sets 332 or 331 by having a wavelength response that differs from the wavelength responses of the other set or sets. For example, each photodiode 331 may be more sensitive and produce a higher output voltage or current than does photodiode 332 in response to incident light having the wavelength $\lambda$, of beam 316, and each photodiode 332 may be relatively more sensitive and produce a relatively higher output voltage or current than does photodiode 331 in response to incident light having a lower wavelength k'. More generally, the output response of each photodiode 331 or 332 may have different functional dependence on the wavelength or spectral composition of deflected light 318. The difference in the responses of photodiodes 331 and 332 may be achieved, for example, using photodiodes having different semiconductor structures or photodiodes with light filters, e.g., color filters, that filter light wavelengths differently. In one example, photodiodes 331 and 332 are photodiode chips having different relative spectral responsivity. (See, for example, Silicon PIN Photodiode TEMD5010X01 and TEMD5080X01 commercially available from Vishay Semiconductors.) The difference in the responses of photodiodes 331 and 332 to different wavelengths of incident light provides information about elastic or inelastic light scattering or fluoresce from particulate 322. For example, a ratio of the voltage output from photodiode 331 to the voltage output from photodiode 332 may depend on the spectral composition of measured light 318 and particularly on the wavelength(s) of fluorescent light or inelastically scattered light from particulate 322, so that the ratio of the output signals from dual photodiodes 331 and 332 provides information about the spectral composition of measured light 318 and therefore the characteristics of and the pollutant type of the particulate 322.

Analysis system 340 can sample the electrical output signals from photodiodes 331 and 332 at a high frequency, e.g., 100 to 500 kHz, to generate separate streams of the sampled measurements from photodiodes 331 and 332. Each sample stream typically has peaks that may correspond to individual particulates 322 passing through the focus of beam 316. The amplitudes and shapes of peaks in the measurement streams provide information regarding characteristics, e.g., the size, shape, reflectivity, color, and type, of particulates, and comparisons of the amplitudes, widths, and timing of the peaks in the two measurement streams provides indications of the spectral content of deflected light 318 and the processes by which light-matter interaction produced deflected light 318.

Analysis system 340 may receive and process sampled light measurement streams from photodiodes 331 and 332 and receive information from other sources to produce measurements or determinations of particulate concentrations, sizes, and types. In some configuration, analysis system 340 has a sensor interface 342 that receives light measurement streams from photodiodes 331 and 332 and may further receive auxiliary measurements from auxiliary sensors 334 in sensing system 330. Auxiliary sensors 334 may measure one or more different properties of the sample in cavity 320, the circuits or components of sensor 300, or of the environment from which the sample was captured. For example, auxiliary sensors 334 may include a temperature sensor, a humidity sensor, or a chemical sensor to measure temperature, humidity, or the presence or concentration of one or more specific chemicals in sample chamber 320, sensing system 330, or the environment surrounding particulate sensor 300, and analysis module 340 may adjust or standardize measurements from photodiodes 331 and 332 based on the measurement data from auxiliary sensors 334.

Analysis system 340 may also include a network interface 344 through which analysis system 340 may receive contextual data 362 from a network 360, e.g., a local network connected to the Internet. Contextual data 362 may, for example, may indicate environmental or other conditions or events at or near the location of particulate sensor 300. Contextual data 362 may, for example, identify nearby flora or fauna or nearby commercial or industrial facilities or nearby events such as fires. Analysis system 340 can use all available data, e.g., peak shapes, difference in photodiode measurements, auxiliary sensor measurements, and contextual data to count particulates, measure the sizes of the particulates, and identify the types of the particulates.

Analysis system 340 in the example shown includes a processing system 346 that may execute or otherwise implement a suite of analytic modules 351 to 357 to perform a multifactor analysis and output a signal indicating, for example, the concentration of particulates and the type or types of particulates measured. Processing system 346 may include a microprocessor or microcontroller with associated memory and input/output interfaces, e.g., sensor interface 342 and network interface 344. Memory in processing system 346 may store light measurement data from photodiodes 331 and 332, auxiliary or environmental measurement data from auxiliary sensor(s) 334, contextual data 362 from the cloud, and software and firmware that processing system 346 executes for implementation of analytic modules 351 to 357.

The illustrated example of analysis system 340 implements a peak detection module 351, particle size and shape modules 352 and 353, and fluorescence characterization module 354 that may use available data to characterize individual particles. A concentration module 355 can determine concentrations of particles of different sizes based on the number and durations of peaks observed in the light measurement data streams. A distribution module 356 may evaluate distributions of the particle characteristics such as the distribution of sizes, shapes, reflectivity, or fluorescent characteristics of a collection of measured particulates.

An identification module 357 may use results from the other analytic modules 351 to 356 and contextual data 362 to identify the type or types of particulates in the sample. In one example, identification module 357 may compare a multifactor measurement set, e.g., a data set including recent measurements of size, shape, reflectivity, and fluorescence distributions to known "fingerprints" for different particle types. The known fingerprints may have been determined or generated in a laboratory or factory using artificial intelligence techniques to analyze measurements of samples containing known types of particulate matter. Such fingerprints may have been store in memory of analysis system 340 during manufacture or downloaded to analysis system 340 from network 360. If identification module 357 identify that a multifactor measurement sufficiently matches a known fingerprint, e.g., the multifactor measurement set has a calculated difference or metric distance from the fingerprint that is less than a predetermined threshold, sensor 300 may infer that the sample contains particles of the type corresponding to the fingerprint.

Figure 4:
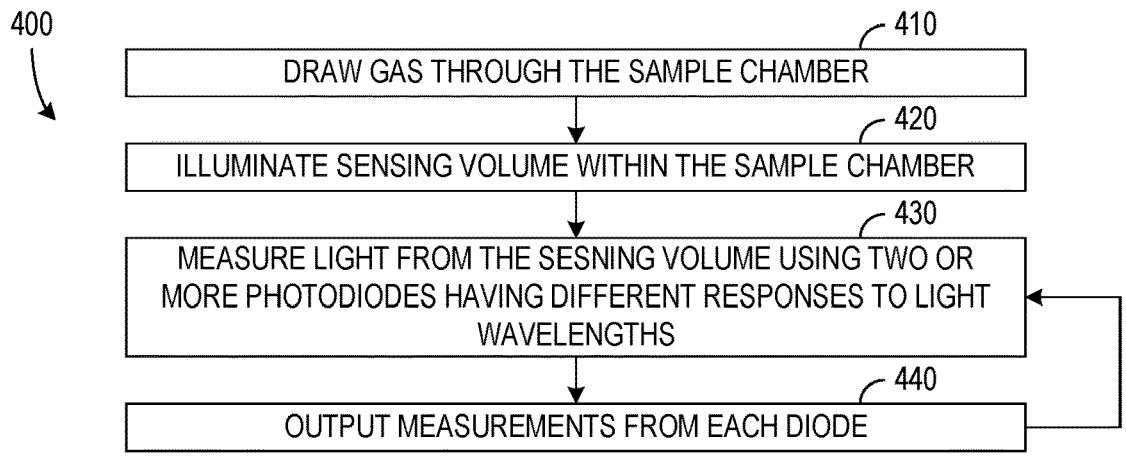
FIG. 4 is a flow diagram of a particulate measurement processes in accordance with an example of the present disclosure.

FIG. 4 is a flow diagram illustrating a process 400 for operation of a particulate sensor in accordance with an example of the present disclosure to detect or measure particulates. Process 400 includes a gas sampling process 410 that draws or otherwise obtains a sample of a gas that may include particulates. In one example of sampling process 410, a fan or air movement system in the particulate sensor draws unfiltered air from a surrounding environment into the sample chamber of the particulate sensor, and the air sample may contain particulates, e.g., pollens, mold spores, dander, soil or dust particles, inorganic pollutants, or contain liquid aerosols, mists, or droplets. In some cases, the sample gas may be continuously drawn into, flow through, and exit the sample chamber. In other cases, a gas sample may be captured and held in the sample chamber for a short time, e.g., held for about 100 µs.

An illumination process 420 of process 400 directs an incident beam through the sample and particularly through a sensing volume within the sample. The incident beam may be a highly collimated or focused beam, such that only particles in a small sensing volume within the sample chamber can deflect a significant amount of light to a light sensing system, e.g., photodiodes 331 and 332 in particulate sensor 300 of FIG. 3. The incident beam may be a continuous intensity beam or may be pulsed on and off. The beam may be a short-wavelength, monochromatic beam. The beam more generally contains a wavelength short enough to cause fluorescence in specific types of particulate matter of interest. For example, a UV wavelength shorter than about 400 nm can cause many particles of biological matter to fluoresce.

In one specific example of illumination process 420, a UV laser or other source of short-wavelength electromagnetic radiation directs the beam through an optical system, e.g., a lens or mirror system, that focuses the beam into a sensing volume, e.g., a volume less than about 0.15 mm in diameter, inside the sample chamber. One or more particles may be suspended in the gas sample, and the sensing volume may be small enough (and the concentration of particles in the gas sample may be low enough) that only one particle at a time is likely be in the sensing volume. Each particle in the sensing volume interacts with the incident beam and deflects, e.g., reflects or scatters, light. Further each particle exposed to the focused beam in the sensing volume may subsequently fluoresce or not depending on the chemical or physical properties of the particulate. If the particle fluoresces, the wavelength of the fluoresced light generally is longer than the wavelength of the incident beam, but the wavelength of fluorescent light depends on the type or composition of the fluorescing particle.

A measurement process 430 of process 400 uses two or more sets of photodiodes or other light sensors having different wavelength responses to measure light, e.g., the deflected or fluorescent light, exiting the sensing volume at a non-zero angle to the direction or axis of the sensing beam. The photodiodes may, for example, measure side scattering or wide-angle scattering, e.g., about 90° or more from the incident beam axis, since light at such angles may be easier to detect and distinguish from stray or noise light from the incident beam but detection of small angle scattering is also possible. The photodiodes or other light sensors used for the measurement have different sensitivities or responses to the wavelengths of the light measured. In a dual photodiode sensor system, for example, two photodiodes may be structurally or chemically different so that the two photodiodes have sensitivities with different dependence on the wavelength of the measured light. Specifically, one of two photodiodes may be relatively more sensitive to light having wavelengths longer than the wavelength of the light from the beam source, so that when a particulate emits fluorescent light, the electrical signal output from the photodiode more sensitive to longer wavelengths will be relatively larger compared to the electrical signal output from the other photodiode.

An output process 440 samples and outputs measurements respectively from the photodiodes or other light sensors in the particulate sensor, and the measurement and output processes 430 and 440 may be repeated at a relatively high frequency, e.g., 100 to 500 kHz, so that for each particle entering the sensing volume, repetition of processes 430 and 440 outputs measurement streams representing light intensity measurements from respective photodiodes measuring deflected light at multiple times while the particle passes through the sensing volume.

Figure 5:
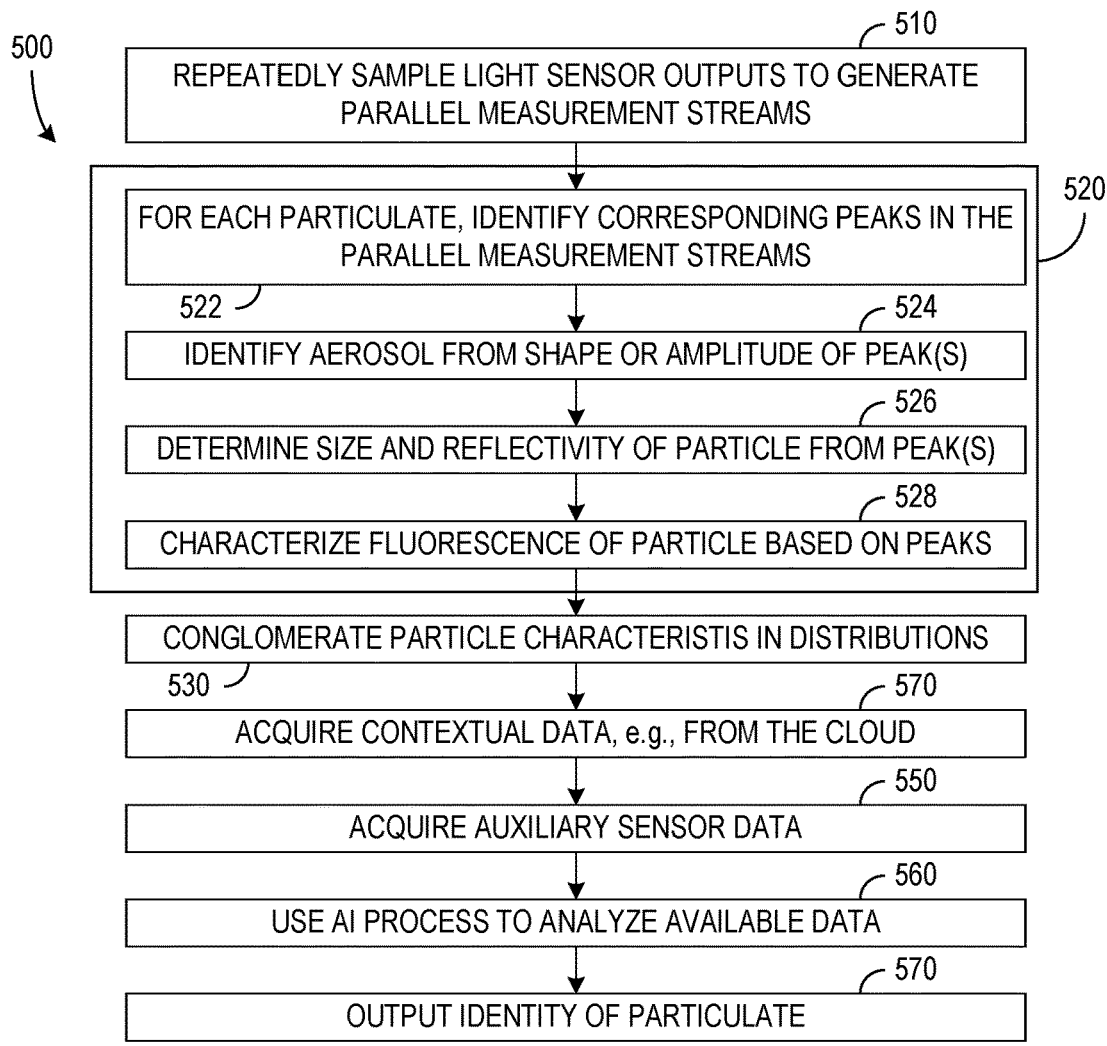
FIG. 5 is a flow diagram of a particulate identification processes in accordance with an example of the present disclosure.

FIG. 5 is a flow diagram of a process 500 including analysis of light measurement streams in a dual photodiode particulate sensor. In a sampling process 510 of process 500, amplification circuits in the dual-photodiode particulate sensor can sample output measurements from the photodiodes at a frequency around 100 to 500 kHz. The high sampling rate results in two parallel measurement streams respectively from the two light sensors or photodiodes, and each measurement stream contains multiple measurements that form a peak for each particle. Alternatively, more than two different types of photodiodes may be used to produce more than two measurement streams.

A peak analysis process 520 analyzes the peaks that occur in the measurement streams and includes a peak identification process 522, an aerosol detection process 524, a particulate size and reflectivity determination process 526, and fluorescence characterization process 528.

Peak identification process 522 can identify respective the peaks, i.e., the sets of light measurements, in the measurement streams that correspond to the same particle. For each particle, processes 524, 526, and 528 may process the peaks to determine characteristics of the particle.

Aerosol identification process 524 may use the shape of the measured refection peak from the particle to identify a liquid droplet. For example, a double peak or low intensity peak may indicate a water droplet or other particle of an aerosol.

Size and reflectivity determination process 526 can infer the size and reflectivity of the particle from the shape of the measured peak. For example, a brighter or more reflective particle produce a higher peak in measured reflected light, and a larger particle tends to produce a broader or longer duration peak in measured reflected light.

Fluorescence characterization process 528 may determine the presence, amount, or wavelength of any fluorescence from the particle. In a dual photodiode particulate sensor in accordance with one example of the present disclosure, the sensitivity of one photodiode relative to the sensitivity of the other photodiode increases with wavelength at wavelengths longer than the wavelength of the incident beam. As a result, an analysis system may use a ratio of the response of one photodiode to the response of the other photodiode to determine the wavelengths at which the particle fluoresces, and the wavelength of fluorescent light (if any) from the particle may similarly be measured or approximated. The fluorescent characteristics of each particle may thus be separately determined.

A conglomeration process 530 combines the characteristics such as sizes, reflectivity, and fluorescence of a collection of particles to generate distributions representing a gas sample. Each distribution may indicate counts of particles in "buckets" or ranges of a measurement. For example, a size distribution may indicate how many of a collection of particles, e.g., a specific quantity such as 500 to 10,000 particles or all particles detected during specific time such as the last 15 second, have a size in a range 0.1 to 0.2 microns, 0.2 to 0.3 microns, . . . 2.4 to 2.5 microns. Similarly, a distribution of fluorescent characteristics of a group of particulates may be collectively determined to indicate the numbers of particles that fluoresce in several respective wavelength ranges.

Additional data acquisition processes 540 and 550 may acquire additional information that may be used in identifying particulates. Contextual data acquisition process 560 may acquire contextual data from the Cloud. For example, the particulate sensor or analysis system may access contextual data from the Internet that may identify specific types of particulates that a database links to the location of the particulate sensor. Contextual data may indicate specific types of pollen, spores, or dander that might be from flora or fauna known to be sufficiently near to the location of the particulate sensor or may indicate smoke or other pollutant particulates that might result from activities or events known to be sufficiently near the location of the particulate sensor. Contextual data might also indicate temperature or other weather conditions at the location of the particulate sensor. Environmental data acquisition process 550 locally measures the sample, sensor, or surrounding environment to provide information on, for example, temperature, humidity, carbon dioxide, or chemical concentrations in the particulate sensor or around the location of the particulate sensor.

A type-identification process 560 may use artificial intelligence (AI) techniques on available measurements and data to identify one or more particulate types. For example, florescent light measurements (from process 550) may be a factor used to determine characteristics, e.g., types, of individual particles. Process 560 may use measurements of individual particles and distributions (from process 560) that represent a sample to determine particulate types in the sample. For example, the size distribution of the suspended particulates, which may be determined from analysis of the series of peaks conglomerated in process 560, provides information or a factor that may suggest or indicate the type of particulates. As noted above, the size distributions of particulates of some types of particulates, e.g., mold, are typically less uniform that the size distributions for other types of particulates, e.g., pollen. The vertical or height distribution of measured peaks may also distinguish different pollutant types, as different reflectivity of UV light or particle colors reflect the UV light differently. Brighter particles would have a stronger reflectance than liquid droplets in an aerosol. Florescent light measurements may be similarly conglomerated to produce a distribution as a factor that suggests or distinguishes the pollutant type or types in the air sample.

The analysis system performing process 560 can compare or match information including the high sample rate photodiode measurements to a set of experimentally determine data patterns found for specified particulate types. The comparison finding a match indicates or determine what particulate is suspended in the measured sample.

Additional contextual information such as nearby pollen sources or measurements from other sensors may be applied to the analysis or the result identifying a particulate type. From all the combined information, the processing system in a process 570 outputs a type identifying what the particulates are.

Each of modules disclosed herein may include, for example, hardware devices including electronic circuitry for implementing the functionality described herein. In addition, or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although implementations have been disclosed, the described implementations are only examples and should not be taken as limitations. Various adaptations and combinations of features of the implementations disclosed are within the scope of the following claims.

What is claimed is:
1. A particulate matter sensor comprising:
a beam source positioned to direct a beam through gas sample in a sensing volume, the beam being a monochromatic beam;
a first light sensor positioned to repeatedly measure light from interactions of the beam with particulates in the sensing volume, the first light sensor having a first measurement sensitivity;
a second light sensor positioned to repeatedly measure the light from the interactions of the beam with the particulates in the sensing volume, the second light sensor having a second measurement sensitivity having a dependence on wavelength of the light measured and that differs from a dependence of the first measurement sensitivity on the wavelength of the light measured; and
an analysis system coupled to receive a first stream of measurements from the first light sensor and a second stream of measurements of the second light sensor, the analysis system being configured to use the first stream and the second stream to identify types of particulates that interact with the beam.

2. The particulate matter sensor of claim 1, wherein the beam is a beam of ultraviolet light.

3. The particulate matter sensor of claim 1, wherein:
the first light sensor includes a first photodiode; and
the second light sensor includes a second photodiode, the second photodiode having a relative spectral responsivity that differs from a relative spectral responsivity of the first photodiode.

4. The particulate matter sensor of claim 1, wherein the analysis system is further configured to determine a fluorescence characteristic of a particle using a first measurement that is in the first stream and corresponds to an interaction of the particle with the beam and using a second measurement that is in the second stream and correspond to the interaction of the particle with the beam.

5. The particulate matter sensor of claim 4, wherein the analysis system determines the fluorescence characteristic of the particle from a ratio of the first measurement and the second measurement.

6. The particulate matter sensor of claim 5, wherein the fluorescence characteristic is one factor in a multifactor analysis that the analysis system performs to identify the types of particulates.

7. The particulate matter sensor of claim 1, further comprising a sensor interface coupled to the first light sensor, the sensor interface generating the first stream by sampling output from the first light sensor at a sampling frequency greater than 100 kHz.

8. The particulate matter sensor of claim 7, wherein the sampling frequency is less than 500 kHz.

9. The particulate matter sensor of claim 1, wherein the analysis system is further configured to determine one or more distributions of characteristics for a collection of individual particles that interact with the beam, and to use the one or more distributions as one or more factors in a multifactor analysis that the analysis system performs to identify the types of particulates.

10. The particulate matter sensor of claim 9, wherein the one or more distributions comprises one or more of a distribution of sizes of the particles in the collection, a distribution of fluorescence characteristics of the particles in the collection, a distribution of reflectivity of the particles in the collection, and a distribution of shapes of the particles in the collection.

11. The particulate matter sensor of claim 1, wherein the analysis system is further configured to detect a series of pulses in the first stream, wherein each of the pulses corresponds to an interaction of the beam with a particle that corresponds to the pulse.

12. The particulate matter sensor of claim 11, wherein for each of the pulses, the analysis system determines a pulse width and using the pulse width determines a size of the particle that corresponds to the pulse.

13. The particulate matter sensor of claim 11, wherein for each of the pulses, the analysis system determines a pulse height and using the pulse height determines a reflectivity of the particle that corresponds to the pulse.

14. The particulate matter sensor of claim 11, wherein for each of the pulses, the analysis system determines a pulse shape and using the pulse shape identifies a shape of the particle that corresponds to the pulse.

* * * * *